(12) United States Patent
Menzies et al.

(10) Patent No.: US 6,410,464 B1
(45) Date of Patent: Jun. 25, 2002

(54) HAND-TEARABLE TAPE

(75) Inventors: Robert H. Menzies; Robert J. Maki, both of Hudson, WI (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/166,206

(22) Filed: Oct. 2, 1998

(51) Int. Cl.[7] .............................. B32B 5/08; B32B 5/26; D04H 13/00; C09J 7/04
(52) U.S. Cl. .................... 442/151; 442/58; 442/149; 442/381; 442/392; 428/343; 428/354; 428/355 AC
(58) Field of Search .................. 442/151, 149, 442/58, 381, 392; 428/343, 354, 355 AC

(56) References Cited

U.S. PATENT DOCUMENTS

| | | | |
|---|---|---|---|
| RE24,906 E | | 12/1960 | Ulrich |
| 3,364,063 A | * | 1/1968 | Satas .......................... 442/151 |
| 3,887,745 A | | 6/1975 | Yoshii et al. ................ 428/213 |
| 4,292,360 A | | 9/1981 | Riedel ......................... 428/171 |
| 4,302,500 A | | 11/1981 | Flora ........................... 428/284 |
| 4,303,724 A | | 12/1981 | Sergeant et al. ............. 428/229 |
| 4,424,808 A | | 1/1984 | Schafer et al. .............. 128/156 |
| 4,427,737 A | | 1/1984 | Cilento et al. ........... 428/315.7 |
| 4,636,427 A | | 1/1987 | Ohno et al. .................. 428/246 |
| 4,679,519 A | | 7/1987 | Linville ....................... 114/103 |
| 4,693,920 A | * | 9/1987 | Agarwal et al. ......... 442/151 X |
| 4,772,499 A | | 9/1988 | Greenway .................... 428/43 |
| 4,781,957 A | | 11/1988 | Brown et al. ................. 428/43 |
| 4,783,355 A | | 11/1988 | Mueller ........................ 428/43 |
| 4,851,064 A | | 7/1989 | Darbo ......................... 156/153 |
| 5,153,049 A | | 10/1992 | Groshens .................... 428/196 |
| 5,162,150 A | | 11/1992 | Buis et al. .................. 428/343 |
| 5,246,773 A | | 9/1993 | Mamish ...................... 428/286 |
| 5,308,668 A | | 5/1994 | Tsuji ............................ 428/43 |
| 5,308,695 A | | 5/1994 | Arakawa et al. ............ 428/354 |
| 5,496,603 A | * | 3/1996 | Riedel et al. ........... 442/151 X |
| 5,656,167 A | | 8/1997 | Martz |
| 5,762,623 A | | 6/1998 | Murphy et al. ............... 602/75 |
| 5,939,190 A | * | 8/1999 | Pfaff et al. .............. 442/151 X |

FOREIGN PATENT DOCUMENTS

| | | |
|---|---|---|
| JP | 07286144 A | 10/1995 |
| JP | 0911862 A | 5/1997 |
| WO | WO93/15245 | 8/1993 |
| WO | WO97/04154 | 2/1997 |

OTHER PUBLICATIONS

American Society of Testing Materials "ASTM D–3759M–96, Standard Test Method for Tensile Strength and Elongation of Pressure–Sensitive Tapes," pp. 439–444 (1998).

Wente et al., *Manufacture of Superfine Organic Fibers*; Naval Research Laboratory; U.S. Department of Commerce: Office of Technical Services; Washington, D.C., 1–15 (May 25, 1954).

Wente, Superfine Thermoplastic Fibers, *Industrial and Engineering Chemistry*, 48:8, 1342–1346 (1956).

Martz, Joel, Composite Breathable Membranes, *Nonwovens Industry* (Apr. 1998) pp. 92, 95.

* cited by examiner

*Primary Examiner*—Daniel Zirker
(74) *Attorney, Agent, or Firm*—Doreen S. L. Gwin

(57) ABSTRACT

The invention provides a finger-tearable laminate composite that is suitable for use in adhesive tapes. The composite includes a nonwoven fiber web layer, a scrim layer and a binder coated throughtout both layers. The laminate composite is readily torn by hand in both the machine direction and the cross direction.

42 Claims, 2 Drawing Sheets

HAND-TEARABLE TAPE

FIELD OF THE INVENTION

This invention relates to laminate composite materials that can be easily torn by hand in both the machine direction and the cross direction, and to a method of making such laminate composites.

BACKGROUND OF THE INVENTION

Adhesive tapes are commonly constructed of one or more layers of fabric and are sold to consumers in rolls containing several feet of material wrapped around a core. The person who uses the tape must then cut or tear a small length of material from the roll, often no more than an inch or two, as needed from time to time. As virtually every one knows, tearing off such a small length of tape by hand, without the aid of a scissors or other sharp edged instrument, is a vexing task, which often results in failure and a tangled mess. This problem is well known in the tape making art, and many have tried to solve it with various methods designed to impart some measure of "finger tearability" to the fabric of the tape.

It is especially difficult to tear tapes made with nonwoven backings. One approach taken in the art to address the problem has been to emboss patterns on the tape fabric to provide "tear lines" on its surface, along which it is hoped the tearing force will be concentrated so that a piece of tape may be torn in an even line from a roll. PCT patent document No. WO93/15245, for example, discloses a nonwoven sheet material, suitable for use as a tape backing, that has an embossed pattern on its surface and is readily finger-tearable in both the machine direction and the cross direction. The nonwoven web preferably comprises randomly interlaced, tensilized nonfracturable staple fibers and binder fibers. The web is embossed by feeding it between two opposing rolls, one of which is a calender roll having an engraved pattern on its surface.

Another approach taken has been to treat the nonwoven tape fabric with chemicals to form tear lines. U.S. Pat. No. 4,772,499 discloses a tape that is made finger-tearable by the patterned impregnation of a bonding agent throughout the thickness of the nonwoven tape backing. The bonding agent may be a latex and is applied in a series of parallel lines across the width, or cross direction, of the tape.

Other workers have attempted to increase the finger-tearability of nonwoven tapes by combining nonwoven layers with layers of other polymeric materials. U.S. Pat. No. 5,246,773 discloses a tape that comprises a nonwoven synthetic, a backing layer, and a pressure sensitive adhesive layer. The polymeric layer is preferably a polyolefinic material, such as polyethylene, ethylene polyvinyl acetate copolymers, ethylene propylene rubber, polypropylene, polyvinyl chloride, polyisobutylene and conjugated diene butyl. It is said that the polymeric material both coats the nonwoven material and fills the interstices of the nonwoven fibers, so that they will tear substantially evenly only in the direction where the tearing force is exerted.

Despite the work done in the field, there is a need for a nonwoven tape with improved finger-tearability yet with high tensile strength.

SUMMARY

The invention provides a nonwoven composite, suitable for use as a backing in adhesive tapes, that has improved finger-tearability due to the incorporation of a woven scrim as one of the layers in a composite.

The nonwoven composite comprises a nonwoven layer and a weft-inserted scrim layer. The nonwoven web is preferably a carded web, and may be embossed with a pattern to enhance finger-tearability. The weft-inserted scrim is a fabric that includes a series of filaments oriented in the machine direction that are interwoven with a series of filaments oriented in the cross direction. The scrim is bonded to the cover web with a bonding solution, which preferably comprises a latex material. The filaments in the scrim provide tear lines in the composite that make it finger-tearable in both the machine direction and the cross direction.

The invention also provides adhesive tapes, which are made by providing a pressure-sensitive adhesive as an additional layer in the composite.

The invention also provides a method of making the nonwoven composites and tapes of the invention.

DETAILED DESCRIPTION OF THE INVENTION

Figure 1:
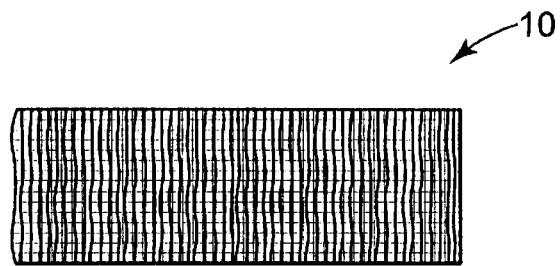
FIG. 1 is a top view of an embodiment of the nonwoven composite of the invention.

The nonwoven composites of the invention are bonded laminates that include a nonwoven web layer and a scrim layer that are held together with a combination of thermal lamination and chemical bonding. A second nonwoven layer may be provided in the composite, forming a bonded laminate having a configuration generally described as nonwoven layer // scrim layer // nonwoven layer. Adhesive tapes may also be made according to the invention, by applying an adhesive to a scrim surface or a nonwoven surface of any of the composites disclosed herein. The tapes and composites of the invention are finger-tearable, porous, flexible, conformable and strong.

The invention is best understood with reference to the figures, in which like reference numerals refer to similar structures throughout.

Figure 2:
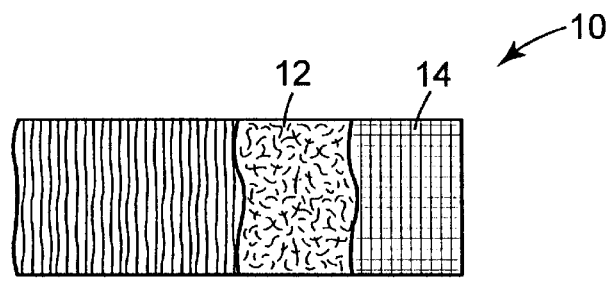
FIG. 2 is a top view showing an embodiment of the nonwoven composite of the invention with layers cut away to show each of the individual layers of the composite.
Figure 3:
FIG. 3 is a cross sectional view of an embodiment of the nonwoven composites of the invention.

The nonwoven composite 10 of the invention, best shown in FIGS. 1–3, includes a nonwoven web layer 12 and a scrim layer 14. The two layers of the composite 10 are thermally bonded together and then coated with a chemical binder solution.

The nonwoven web layer 12 is preferably embossed with a pattern that facilitates tearing in the cross direction. As used herein, the term nonwoven web means a fibrous web that has been formed without the use of a weaving process. Nonwoven webs may be formed using any of several processes known in the art, including, without limitation, melt blowing processes, spun bonding processes, spunlacing processes, needle punched web making processes, air laid web making processes, wet laid web making processes, film aperturing processes and staple fiber carding processes.

In the preferred embodiment, nonwoven web layer 12 is a carded web made by a process well known in the art, such as that discussed in PCT patent publication No. WO93/15245, which is incorporated herein by reference. The carded web includes staple fibers and binder fibers. The staple fibers are formed from synthetic polymers and are drawn during manufacture so that the polymer chains substantially orient in the machine direction of the fiber and will not break when subjected to a moderate breaking force. Suitable staple fibers for use in the invention include cellulose acetate, polyester staple fibers, polyolefin staple fibers, polyamide staple fibers, polyacrylate staple fibers, polycarbonate staple fibers, polysulfone staple fibers, or combinations thereof. Preferably, the staple fibers comprise oriented staple fibers, such as oriented polyethylene, polypropylene, or polybutylene staple fibers, oriented polyester staple fibers, such as polyethylene terephthalate (PET), or combinations thereof. In a particularly preferred embodiment, the staple fibers used in the invention comprise polyester or rayon (cellulose acetate).

Any type or types of binder fibers can be employed to form the fibrous web of the present invention, as long as they are capable of melt-bonding to the staple fibers of the fibrous web without fracturing, or substantially weakening the staple fibers. In this regard, it is preferable that the binder fibers be formed from one or more man-made thermoplastic polymers that are capable of melt-bonding with the staple fibers used in the nonwoven composites and tapes of the present invention. The binder materials may comprise a wide variety of binder fiber combinations that are well known in the art, including, without limitation, totally meltable binder fibers, side-by-side binder fibers, bicomponent binder fibers, elliptical core-sheath binder fibers, concentric core-sheath binder fibers, or combinations thereof. Examples of suitable binder fibers include, without limitation, polyester, polyester binder fibers, polyolefin binder fibers, such as thermoplastic polyethylene, polypropylene, and polybutylene binder fibers, polyamide binder fibers, or combinations thereof. In a particularly preferred example the binder fiber is a bicomponent polyester.

The weight ratio of staple fibers to binder fibers in the nonwoven web 12 will depend upon the application to which the nonwoven webs or tapes of the invention are to be put. Generally, from about 95% to about 50%, preferably from about 90% to about 60% by weight of the fibrous web 12 will be comprised of one or more varieties of staple fibers, while about 50% to about 5%, preferably from about 40% to about 10% by weight of the fibrous web 12 will be comprised of binder fibers. In a preferred aspect, the weight ratio of the staple fibers to binder fibers will be from about 10:1 to about 1:10; more preferably from about 5:1 to about 1:1, and most preferably from about 4:1 to about 2:1.

The scrim layer 14 preferably comprises a fabric that may be formed by strands, yarns or filaments oriented substantially in the machine direction and intersecting strands or filaments oriented substantially in the cross direction. The strands of the scrim 14 provide tear lines that facilitate even tearing of the composite 10 along a straight line in both the machine direction and the cross direction. The strands or filaments of the scrim may be made of any natural or man-made material, but preferably are made of a man-made material. The scrim may be preferably woven, knitted or extruded.

The strands, yarns or filaments of the scrim should be spaced such that the strands enhance the finger-tearability of the composite 10 without interfering with its porosity or flexibility. The thread count of the scrim is, preferably, between 1 and 50 yarns/2.5-cm in the machine direction and between 1 and 50 yarns/2.5-cm in the cross direction, more preferably, between 1 and 30 yarns/2.5-cm in the machine direction and 1 and 30 yarns/2.5-cm in the cross direction, and most preferably, between about 5 and 30 yarns/2.5-cm in the machine direction and between about 5 and 30 yarns/2.5-cm in the cross direction. Examples of suitable scrims include weft-inserted polyester scrims, such as those that are available from Milliken & Company, Spartanburg, N.C., as Product No. 924864, 18 machine direction yarns/2.5-cm (40 denier)×9 cross direction yarns/2.5-cm (150 denier), and Product No. 924916, 18 machine direction yarns/2.5-cm (70 denier)×17 cross direction yarns/2.5-cm (150 denier).

The scrim layer 14 may, alternatively, comprise an extruded plastic netting material made from intersecting filaments oriented substantially in the machine direction and substantially in the cross direction. The extruded net can be made of any thermoplastic polymer suitable for extrusion processes. An example of an extruded plastic material suitable for use in the invention is the polyester plastic netting material weighing 9 g/m$^2$ available as style OB-6275 from Internet Inc., Minneapolis, Minn.

The nonwoven layer 12 and the scrim layer 14 first thermally are bonded together with a binding agent, which may be applied using any of several processes that are recognized in the art. Examples of suitable binding agents include acrylics, polyvinyl acrylics, acetate/ethylene, polyvinyl acetate, and the like. It is preferable that the chemical binding agent comprise a water-based chemical binder, including, without limitation, latexes incorporating acrylics, polystyrene/butadiene rubbers, polychloroprene, polyvinyl acetate/polyethylenes, polyvinyl acetate/polyacrylates, polyvinyl chloride, polyvinyl alcohols, polyurethanes, polyvinyl acetates, acrylic/polyvinyl acetate, and the like. These water-based chemical binders may preferably be applied to the fibrous web at about 10% to about 62% solids, using any suitable coating method, including, wire-bound rod, reverse roll, air-knife, direct and offset gravure, trailing blade, print bond, foam, and spray coating methods. More preferably, the binder solution is applied by gravure coating or foam.

In a preferred embodiment, the binder solution comprises a solution of polyvinyl acrylate latex, such as the polyvinyl acrylate latex available as Product No. 78-6283 from National Starch Co., Bridgewater N.J. The percentage of solids in the solution is, preferably, in the range of about 10–62%, and more preferably, in the range of about 25–36%. In the most preferred embodiment, the binder is an polyvinyl acrylate latex binder having about 36% solids.

Tapes may be made from the nonwoven composite 10 of the invention by applying a pressure-sensitive adhesive layer 16 to the scrim layer 14. The adhesive may be applied to the nonwoven layer using any of several processes known in the art. Preferably, the adhesive is applied by solvent coating the adhesive onto a release liner, and then transferring the adhesive from the release liner to the scrim layer 14.

Suitable pressure sensitive adhesives for use in constructing medical tapes of the invention are those which are physically and biologically compatible with human skin. A wide variety of suitable, skin-compatible, pressure sensitive adhesives are known to those skilled in the art and include specifically, but not exclusively, tackified natural rubbers;

synthetic rubbers such as butyl rubber or isoprene; tackified linear, radial, star, branched or tapered block copolymers, such as styrene-ethylene/butylene and styrene-isoprene; polyvinyl ethers; polyolefins; polysilicones; and acrylic-based adhesives, especially those having long chain alkyl groups. These pressure sensitive adhesives can be applied to the laminates of the invention by processes such as aqueous coating, solvent coating, or hot melt coating. The adhesives can be single components or blended with other adhesives or with non-adhesive materials, including thermoplastics, plasticizers, and fillers. The adhesives can comprise a continuous film layer or foam layer, or can be a discontinuous layer obtained from patterned adhesives or melt-blown pressure sensitive fibers.

A preferred pressure sensitive adhesive is any of the copolymers of isooctyl acrylate and acrylic acid or acrylamide described in U.S. Pat. No. Re 24,906 issued to Ulrich. Such adhesives are preferred for use on medical tapes since they are relatively nonirritating to the skin.

In the most preferred embodiment, the pressure-sensitive adhesive is an acrylate adhesive comprisingf 60% isooctyl acrylate/acrylic acid copolymer (94/6 weight ratio) (3M Company, St. Paul, Minn.) and 40% FORAL™ 85 rosin ester (supplied as a 35% solids in heptane/isopropyl alcohol (90/10 volume ratio), Hercules, Inc., Wilmington, Del.).

Figure 4:
FIG. 4 is a cross sectional view of an embodiment of the nonwoven tape of the invention.

As shown in FIG. 4, the invention also includes a non-woven composite 20 having a configuration generally described as nonwoven // scrim // nonwoven. The second nonwoven layer 18 in this composite 20 may be made of the same nonwoven material as the first nonwoven layer 12, or it may be made of a different material. Preferably, the second nonwoven material 18 is made of the same material as the first nonwoven material 12. In the most preferred embodiment, both the first nonwoven material 12 and the second nonwoven material 18 are carded webs. The composite 20 is made by thermally bonding the scrim 14 between the nonwoven layers 12, 18 and then coating them with a binder solution, as described above. This composite may be made into a tape by applying a pressure-sensitive adhesive, as described above.

Figure 5:
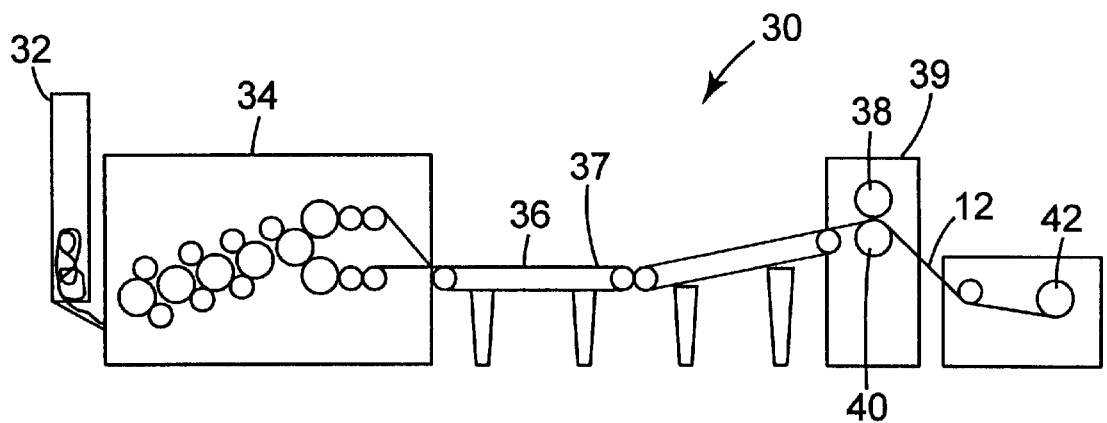
FIG. 5 is a schematic diagram illustrating an embodiment of the method of the invention for making carded webs for use in the nonwoven composites and tapes of the invention.
Figure 6:
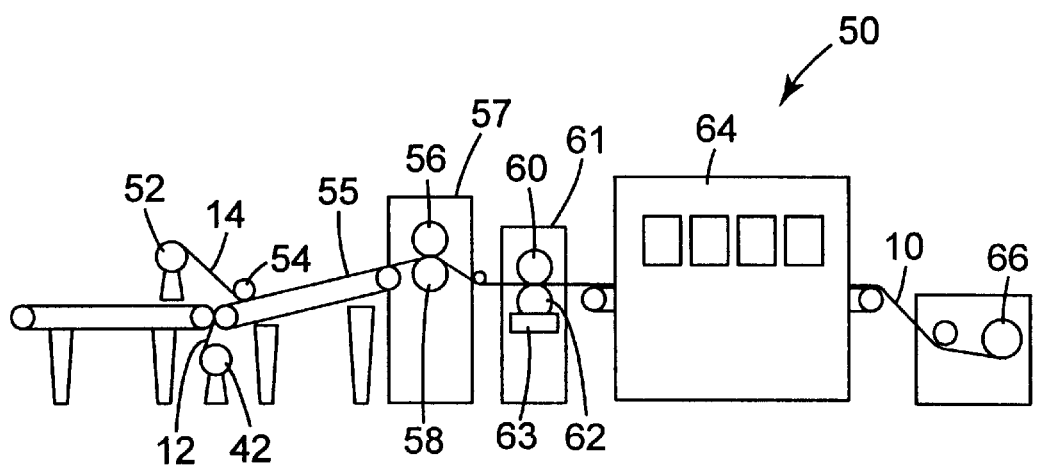
FIG. 6 is a schematic diagram illustrating an embodiment of the method of the invention of making nonwoven composites of the invention.

The method of the invention of making nonwoven composites is illustrated in the schematic diagrams shown in FIGS. 5–6. FIG. 5 shows an apparatus for making embossed carded webs 12 according to the invention, and FIG. 6 shows an apparatus for making a nonwoven composite 10 comprising an carded web layer 12 and a scrim layer 14.

In FIG. 5, a mixture of staple fibers and binder fibers are delivered into the master chute 32 of a carding machine 34, which combs the fibers into parallel arrays to form a loose, uniform web 36. The loose web 36 is transported along conveyor 37 to a temperature controlled, two-roll calendar station 39, where it is thermally laminated at high temperature and embossed with a pattern that enhances finger-tearability in the cross direction. The embossed, carded web 12 is then collected on roll 42.

The two rolls 38, 40 are smooth steel rolls, one of which is preferably engraved with a pattern on its surface that imprints the engraved pattern on the carded web 12. In the preferred embodiment, the engraved pattern is on the upper roll 38. The pattern is preferably a series of spaced-apart, brick-shaped figures in which each brick has two sides oriented substantially in the machine direction and two sides oriented substantially in the cross direction. The spacing between the individual engraved shapes on the roll may be varied within the scope of the invention, but preferably the bricks are spaced across the length of the roll and around its circumference. In a most preferred embodiment, the roll is engraved with a I-9418 40/10 brick pattern, having a 16% bond area, that includes 40-mil (cross-direction)×10-mil (machine direction) bricks spaced 10 mils apart in the cross direction and 40 mils apart in the machine-direction.

The roll 42 of carded web material is then transferred to the apparatus shown in FIG. 6 to form the nonwoven composite material 10. The carded web 12 and scrim material 14 are dispensed by rolls 42, 52, respectively, and brought together under idler roll 54. The two facing layers are transported over conveyor 55 to a temperature-controlled calender station 57, where they are thermally laminated at high temperature and embossed as described above. The thermally laminated and embossed composite is then coated with binder 63 at gravure coating station 61. The resulting composite 10 is then passed through a drying oven 64 and collected on roll 66.

In an alternative embodiment of the method of the invention, the loose web 36 in FIG. 5 is transported directly to the conveyor 55 of FIG. 6 and brought together under idler 14 and are processed otherwise as described above. In the preferred embodiment of the alternative embodiment, one of the calender rolls 56, 58 is engraved with a pattern for embossing the carded web for imparting finger-tearability, as discussed above. In the most preferred embodiment, the upper roll 56 is engraved with a pattern.

EXAMPLES

The following examples are offered to aid in understanding of the present invention and are not to be construed as limiting the scope thereof. Unless otherwise indicated, all parts and percentages are by weight.

Test Protocols

Tensile Strength: ASTM Test Method No. D3759-83 was performed using a Thwing Albert tester (Model EJA/2000, Thwing Albert Company, Philadelphia, Pa.), a sample width of 2.54 cm, a gauge length of 5.08 cm, and a crosshead speed of 25.4 cm/min. Reported is the maximum force applied to the test sample to obtain the tensile value at point of break.

Elongation at Break: ASTM Test Method No. D3759-83 was performed using a Thwing Albert tester (Model EJA/2000, Thwing Albert Company, Philadelphia, Pa.), a sample width of 2.54 cm, a gauge length of 5.08 cm, and a crosshead speed of 25.4 cm/min. Reported is the maximum percent of stretch reached by the test sample at point of break.

Web Porosity: The porosity of 5.08-cm×5.08-cm square samples was determined by measuring the time required for a known volume of air under constant pressure to pass through a known area of sample. Using a Gurley Densometer (Model 4110, Gurley Precision Instruments, Troy, N.Y.), a sample was inserted into the orifice plates and clamped. The spring catch was disengaged lowering the inner cylinder to settle under its own weight. The time for the top of the edge of the cylinder to reach the zero line was recorded. If the cylinder did not move after 5 minutes, a value of 301 seconds was recorded. The smaller the time interval, the greater the porosity of the sample. The average results of three samples were reported.

Hand Tearability: A test sample /2.5-cm wide×7.5-cm long was grasped between the index finger and the thumb of both hands and torn in the cross direction of the sample. The tear line was examined for fraying and/or delamination of the scrim from the carded nonwoven web. The amount of force required to initiate the tear was also considered. If minimal fraying and no delamination were observed in the sample, the sample demonstrated acceptable tear properties. If delamination, fraying, or large forces were necessary to initiate and propagate the tear, the sample had unacceptable or poor tear properties. For cross direction tears, the tear was rated as follows and reported as an average of three replications:

1. Very poor tear with excessive fraying and delamination.
2. Poor tear with a large amount of fraying and delamination.
3. Average tear with some fraying and little delamination.
4. Excellent tear with no fraying and no delamination.
5. Good tear with minimal fraying and no delamination.

Example 1

A thermal-bonded and resin-bonded laminate comprised of a thermal-bonded carded nonwoven web and a weft-inserted scrim was prepared according to the following process.

A 45.7-cm wide carded web consisting of a fiber blend of 60% 3.8-cm 0.95 denier polyester (L-70, Hoechst Celanese, Spartanburg, S.C.), 20% 4.0-cm 1.5-denier rayon (Lenzing, Charlotte, N.C.), and 20% 3.8-cm 2.0 denier bicomponent co-polyester (T-254, Hoechst Celanese, Spartanburg, S.C.) was prepared using a 1.0-meter random card line (Hergeth Hollinsworth, Greenville, S.C.). The loose, uniform web was conveyed at a speed of 12.5 m/min to a two-roll heated calender station manufactured by Energy Solutions Inc., St. Paul, Minn. The calender station was set-up with a 25.4-cm diameter×55.9-cm wide smooth steel roll in the lower position and a 25.4-cm diameter×55.9-cm wide steel roll engraved with a I-9418 40/10 brick pattern in the upper position. The I-9418 pattern roll was engraved by Industrial Engraving, Pulaski, Wis. and consisted of 40-mil (cross-direction) ×10-mil (machine-direction) bricks spaced 10 mils apart in the cross-direction and 40 mils apart in the machine-direction. The brick pattern had a 16% bond area. The loose web was thermal-bonded by passing through the calender at 2070 KPa and 154° C. to afford a web having a basis weight of 30 g/m$^2$. The thermal-bonded, carded web was collected on a 7.62-cm cardboard core.

The thermal-bonded carded web was then thermally laminated to a weft-inserted polyester scrim layer with 18 yarns/2.5-cm (40 denier, machine-direction) and 9 yarns/2.5-cm (150 denier, cross-direction) (Product No. 924864, Milliken & Company, Spartanburg, N.C.). The carded web and scrim were simultaneously fed into the heated calender station as described above at a speed of 3.66 m/min. The resulting web/scrim composite was then resin-bonded with a 25% solids polyvinyl acrylate latex solution (Product No. 78-6283, National Starch, Bridgewater, N.J.) by passing through a gravure coating station at a speed of 9.14 m/min and a nip pressure of 414 KPa. The gravure coater was set-up with a 20.3-cm diameter×61-cm wide threaded rubber roll in the upper position and a 20.3-cm diameter×61-cm wide, 16 lines/cm trihelical pattern steel roll (Northern Engraving, Green Bay, Wis.) in the lower position. The resulting laminate was dried by passing through a 171° C. oven at a speed of 9.3 m/min and collected on a 7.62-cm cardboard core. The thermal-bonded and resin-bonded laminate had a basis weight of 71 g/m$^2$.

Samples of the laminate were evaluated for tensile strength, percent elongation, porosity, and hand tearability. The results are shown in Table 1 along with results for the commercial adhesive tapes ZONAS POROUS™ tape (Johnson & Johnson, Arlington, Tex.) and MICROPORE™ tape (3M Company, St. Paul, Minn.).

Example 2

A thermal-bonded and resin-bonded laminate comprised of two thermal-bonded carded nonwoven webs and a weft-inserted scrim was prepared according to the following process.

A 45.7-cm wide carded web consisting of a fiber blend of 80% 3.8-cm 1.0 denier polyester (T-121, Hoechst Celanese), and 20% 3.8-cm 3.0 denier bicomponent co-polyester (K-52, Hoechst Celanese) was prepared using a 1.0-meter random card line (Hergeth Hollinsworth). The loose, uniform web was conveyed at a speed of 9 m/min to a two-roll heated calender station set-up as described in Example 1. The loose web was thermally bonded by passing through the calender at 2070 KPa and 201.7° C. to afford a web having a basis weight of 23 g/m$^2$. The thermal-bonded carded web was collected on a 7.62-cm cardboard core. A second web was prepared in an identical manner.

The two thermal-bonded carded webs were then thermally laminated to a polyester weft-inserted scrim (Product No. 924864, Milliken & Company). The carded webs and scrim were simultaneously fed into the heated calender station set-up as described in Example 1 at a speed of 3.66 m/min (690 KPa, 154° C.) and with the scrim sandwiched between the two carded webs. The resulting web/scrim/web composite was then resin-bonded with a 25% solids polyvinyl acrylate latex solution, dried; and collected as described in Example 1. The thermal-bonded and resin-bonded laminate had a basis weight of 84 g/m$^2$.

Samples of the laminate were evaluated for tensile strength, percent elongation, porosity, and hand tearability. The results are shown in Table 1.

Example 3

A thermal-bonded and resin-bonded laminate comprised of a thermal-bonded carded nonwoven web and a weft-inserted scrim was prepared according to the following process.

A thermal-bonded carded web was prepared as described in Example 1, except that the calender station was set-up with a smooth steel roll in place of the engraved roll in the upper position. The loose web was thermally bonded by passing through the calender at a speed of 6.7 m/min (1380 KPa, 154° C.) to afford a web having a basis weight of 30 g/m$^2$. The thermal-bonded carded web was collected on a 7.62-cm cardboard.

The thermal-bonded carded web was then thermally laminated to a polyester weft-inserted scrim (Product No. 924864, Milliken & Company). The carded web and scrim were simultaneously fed into the heated calender station set-up as described in Example 1 at a speed of 6.7 m/min (690 KPa, 154° C.). The resulting web/scrim/web composite was then resin-bonded with a 36% solids polyvinyl acrylate latex solution, dried, and collected as described in Example 1. The thermal-bonded and resin-bonded laminate had a basis weight of 81 g/m$^2$.

Example 4

A thermal-bonded and resin-bonded laminate comprised of a carded nonwoven web and a weft-inserted scrim was prepared according to the following process.

A 45.7-cm wide carded web consisting of a fiber blend of 80% 3.8-cm 0.95 denier polyester (L-70, Hoechst Celanese), and 20% 3.8-cm 2.0 denier bicomponent co-polyester (T-254, Hoechst Celanese) was prepared using a 1.0-meter random card line (Hergeth Hollinsworth). The loose, uniform web was conveyed at a speed of 9 m/min to a two-roll heated calender station set-up as described in Example 1. The loose web was thermally laminated to a polyester weft-inserted scrim (Product No. 924864, Milliken & Company). The carded web and scrim were simultaneously fed into the heated calender station set-up as described in Example 1 at a speed of 6.9 m/min (690 KPa, 154° C.). The resulting web/scrim composite was then resin-bonded with a 25% solids polyvinyl acrylate latex solution, dried, and collected as described in Example 1. The thermal-bonded and resin-bonded laminate had a basis weight of 74 g/m$^2$.

Example 5

A thermal-bonded and resin-bonded laminate comprised of a carded nonwoven web and a weft-inserted scrim was prepared according to the process of Example 4, except that the web and scrim were thermally laminated at a speed of 7.0 m/min (1380 KPa, 154° C.), and the web/scrim composite was chemically foam-bonded at a speed of 7.0 m/min with a 30% solids polyvinyl acrylic latex solution. The foam was generated with a foam generator made by Lesco, Dalton, Ga. and the foam was applied to the composite by a 45.7-cm parabolic die made by Gaston County, Stanley, N.C. The resulting thermal-bonded and resin-bonded laminate had a basis weight of 70 g/m$^2$.

Example 6

A thermal-bonded and resin-bonded laminate comprised of a carded nonwoven web and a weft-inserted scrim was prepared according to the process of Example 4, except that the carded web consisted of a fiber blend of 70% 3.8-cm 0.95 denier polyester and 30% 3.8-cm 2.0 denier bicomponent co-polyester; and the web and scrim were thermally laminated at a speed of 7.0 m/min (1380 KPa, 154° C.). The resulting thermal-bonded and resin-bonded laminate had a basis weight of 70 g/m$^2$.

Example 7

A thermal-bonded and resin-bonded laminate comprised of a carded nonwoven web and a weft-inserted scrim was prepared according to the process of Example 4, except that the carded web consisted of a fiber blend of 60% 3.8-cm 0.95 denier polyester, 20% 3.8-cm 2.2 denier polypropylene (Hercules, Oxford, GA), and 20% 3.8-cm 2.0 denier bicomponent co-polyester; and the web and scrim were thermally laminated at a speed of 6.9 m/min (1380 KPa, 154° C.). The resulting thermal-bonded and resin-bonded laminate had a basis weight of 70 g/m$^2$.

Example 8

A thermal-bonded and resin-bonded laminate comprised of a carded nonwoven web and a weft-inserted scrim was prepared according to the process of Example 4, except that the carded web consisted of a fiber blend of 60% 3.8-cm 0.95 denier polyester, 20% 3.8-cm 6.0 denier DELCRON™ polyester (Dupont, Wilmington, Del.), and 20% 3.8-cm 2.0 denier bicomponent co-polyester; and the web and scrim were thermally laminated at a speed of 6.9 m/min (1380 KPa, 154° C.). The resulting thermal-bonded and resin-bonded laminate had a basis weight of 69 g/m$^2$.

Example 9

A thermal-bonded and resin-bonded laminate comprised of a carded nonwoven web and a weft-inserted scrim was prepared according to the process of Example 4, except that an engraved 30/20 brick pattern was used in place of the 40/10 pattern. The pattern roll consisted of 30-mil (cross-direction)×10-mil (machine-direction) bricks spaced 20 mils apart in the cross-direction and 40 mils apart in the machine-direction. The brick pattern had a 12% bond area. The resulting thermal-bonded and resin-bonded laminate had a basis weight of 71 g/m$^2$.

Example 10

A thermal-bonded and resin-bonded laminate comprised of a carded nonwoven web and a weft-inserted scrim was prepared according to the process of Example 4, except that the carded web consisted of a fiber blend of 60% 3.8-cm 0.95 denier polyester, 20% 3.8-cm 2.2 denier polypropylene (Hercules, Oxford, Ga.), and 20% 3.8-cm 2.0 denier bicomponent co-polyester; that the engraved 30/20 brick pattern as described in Example 9 was used in place of the 40/10 pattern; and that the 25% solids polyvinyl acrylic latex solution was replaced with a 36% solids solution. The resulting thermal-bonded and resin-bonded laminate had a basis weight of 80 g/m$^2$.

Example 11

A thermal-bonded and resin-bonded laminate comprised of a carded nonwoven web and a weft-inserted scrim was prepared according to the process of Example 10, except that a 18 yarns//2.5-cm (70 denier, machine-direction) and 17 yarns/2.5-cm (150 denier, cross-direction) weft-inserted polyester scrim (Product No. 924916, Milliken & Company) was used in place of the 40×150 denier weft-inserted scrim, and that the 25% solids polyvinyl acrylic latex solution was replaced with a 36% solids solution. The resulting thermal-bonded and resin-bonded laminate had a basis weight of 102 g/m$^2$.

Example 12

A thermal-bonded and resin-bonded laminate comprised of a carded nonwoven web and a weft-inserted scrim was prepared according to the process of Example 9, except that a 18 yarns/2.5-cm (70 denier, machine-direction) and 17 yarns/2.5-cm (150 denier, cross-direction) weft-inserted polyester scrim (Product No. 924916, Milliken & Company) was used in place of the 40×150 denier weft-inserted scrim, and that the 25% solids polyvinyl acrylic latex solution was replaced with a 36% solids solution. The resulting thermal-bonded and resin-bonded laminate had a basis weight of 100 g/m$^2$.

Example 13

A thermal-bonded and resin-bonded laminate comprised of a carded nonwoven web and a weft-inserted scrim was prepared according to the process of Example 9, except that a 36% solids polyvinyl acrylate latex solution was used in place of the 25% solids polyvinyl acrylate latex solution. The resulting thermal-bonded and resin-bonded laminate had a basis weight of 100 g/m$^2$.

Example 14

A thermal-bonded and resin-bonded laminate comprised of a thermal-bonded carded nonwoven web and a weft-inserted scrim was prepared according to the process of Example 3, except that a 18 yarns/2.5 cm (70 denier, machine-direction) and 17 yarns/2.5 cm (150 denier, cross-direction) weft-inserted polyester scrim (Product No.

924916, Milliken & Company) was used in place of the 40×150 denier weft-inserted scrim. The resulting thermal-bonded and resin-bonded laminate had a basis weight of 100 g/m².

Example 15

A thermal-bonded and resin-bonded laminate comprised of a carded nonwoven web and a weft-inserted scrim was prepared according to the process of Example 4, except that a 18 yarns/2.5 cm (70 denier, machine-direction) and 9 yarns/2.5 cm (70 denier, cross-direction) weft-inserted polyester scrim (Milliken & Company) was used in place of the 40×150 denier weft-inserted scrim, and that the 25% solids polyvinyl acrylic latex solution was replaced with a 36% solids solution. The resulting thermal-bonded and resin-bonded laminate had a basis weight of 89 g/m².

Examples 16–28

Each of the thermal-bonded and resin-bonded laminates of Examples 3–15 was converted into a corresponding pressure sensitive adhesive (PSA) tape according to the following process.

An acrylate adhesive comprised of 60% isooctyl acrylate/acrylic acid copolymer (94/6 weight ratio) (RD971, 3M Company, St. Paul, Minn.) and 40% FORAL™ 85 rosin ester (supplied as a 35% solids in heptane/isopropyl alcohol (90/10 volume ratio), Hercules, Inc., Wilmington, Del.) was solvent coated onto a silicone release liner (Product No. 2-60BKG-157&99AM, Daubert, Dixon, Ill.). The adhesive coating of 50 micrometers/10.16-cm×15.24-cm area was prepared with a 25.4-cm wide knife coater at a gap of 10 mils. The adhesive-coated liner was dried using a dual oven system with the first oven at 46° C. and the second oven at 76° C. The acrylate adhesive was then transferred to the scrim side of each individual laminate with a heated laminating roll at 38° C. and 621 KPa. The resulting adhesive coated laminates were cut into samples and evaluated for tensile strength at break (machine direction), percent elongation at break (machine direction), porosity, and hand tearability. The results are shown in Table 1.

Test Data

Laminates from Examples 1 and 2, and adhesive tapes from Examples 16–28 were cut into appropriate sample sizes and evaluated for tensile strength at break (machine direction), percent elongation at break (machine direction), porosity, and hand tearability. The results are shown in Table I along with results for the commercial adhesive tapes ZONAS POROUS™ tape (Johnson & Johnson, Arlington, Tex.) and MICROPORE™ tape (3M Company, St. Paul, Minn.).

TABLE 1

Evaluation Results for Laminates (Examples 1 & 2) and Adhesive Tapes (Examples 16–28)

| Laminate Sample | Tape Sample | Web Composition | Scrim (Denier) | Engraved Pattern | Tensile Strength (N/2.5 Cm) | Elongation (%) | Porosity (sec) | Tear (1–5) |
|---|---|---|---|---|---|---|---|---|
| 1 | None | L-70 Polyester(60%) Lenzing Rayon(20%) T-254 Co-Polyester(20%) | 40 × 150 | 40/10 | 34 ± 1 | 13.5 ± 2.5 | 120 ± 20 | 3 |
| 2 | None | T-121 Polyester(80%) K-52 Co-Polyester(20%) | 40 × 150 | 40/10 | 66 ± 4 | 14.0 ± 1.0 | 61 ± 18 | 3 |
| 3 | 16 | L-70 Polyester(60%) Lenzing Rayon(20%) T-254 Co-Polyester(20%) | 40 × 150 | 40/10 | 108 ± 16 | 24.0 ± 4.6 | 39 ± 16 | 3 |
| 4 | 17 | L-70 Polyester(80%) T-254 Co-Polyester(20%) | 40 × 150 | 40/10 | 106 ± 12 | 22.5 ± 1.5 | 61 ± 30 | 4 |
| 5 | 18 | L-70 Polyester(80%) T-254 Co-Polyester(20%) | 40 × 150 | 40/10 | 68 ± 11 | 13.3 ± 3.2 | 90 ± 6 | 4 |
| 6 | 19 | L-70 Polyester(70%) T-254 Co-Polyester(30%) | 40 × 150 | 40/10 | 61 ± 10 | 18.9 ± 1.3 | 2 ± 1 | 4 |
| 7 | 20 | L-70 Polyester(60%) T-196 Polypropylene(20%) T-254 Co-Polyester(20%) | 40 × 150 | 40/10 | 70 ± 2 | 23.4 ± 2.6 | 2 ± 1 | 4 |
| 8 | 21 | L-70 Polyester(60%) DELCRON ™ Polyester(20%) T-254 Co-Polyester(20%) | 40 × 150 | 40/10 | 57 ± 4 | 20.0 ± 1.5 | 39 ± 15 | 2 |
| 9 | 22 | L-70 Polyester(80%) T-254 Co-Polyester(20%) | 40 × 150 | 30/20 | 112 ± 1 | 23.4 ± 3.1 | 33 ± 15 | 3 |
| 10 | 23 | L-70 Polyester(60%) T-196 Polypropylene(20%) T-254 Co-Polyester(20%) | 40 × 150 | 30/20 | 113 ± 4 | 25.3 ± 1.3 | 16 ± 2 | 2 |
| 11 | 24 | L-70 Polyester(60%) T-196 Polypropylene(20%) T-254 Co-Polyester(20%) | 70 × 150 | 30/20 | 159 ± 6 | 26.7 ± 1.1 | 12 ± 1 | 2 |
| 12 | 25 | L-70 Polyester(80%) T-254 Co-Polyester(20%) | 70 × 150 | 30/20 | 183 ± 3 | 28.6 ± 0.2 | 32 ± 15 | 4 |
| 13 | 26 | L-70 Polyester(80%) T-254 Co-Polyester(20%) | 40 × 150 | 30/20 | 109 ± 5 | 20.2 ± 2.7 | 4 ± 2 | 4 |

TABLE 1-continued

Evaluation Results for Laminates (Examples 1 & 2) and Adhesive Tapes (Examples 16–28)

| Laminate Sample | Tape Sample | Web Composition | Scrim (Denier) | Engraved Pattern | Tensile Strength (N/2.5 Cm) | Elongation (%) | Porosity (sec) | Tear (1–5) |
|---|---|---|---|---|---|---|---|---|
| 14 | 27 | L-70 Polyester(80%) T-254 Co-Polyester(20%) | 70 × 150 | 40/10 | 190 ± 9 | 34.6 ± 2.9 | 2 ± 1 | 4 |
| 15 | 28 | L-70 Polyester(80%) T-254 Co-Polyester(20%) | 70 × 70 | 40/10 | 214 ± 3 | 33 ± 0.9 | 18 ± 8 | 3 |
| ZONAS POROUS ™ Tape | | | | | 193 ± 4 | 5.6 ± 0.3 | 1 ± 1 | 4 |
| MICROPORE ™ Tape | | | | | 36 ± 2 | 14.6 ± 1.5 | 1 ± 1 | 4 |

It can be concluded from the test results provided in Table 1 that the thermal- and resin-bonded laminates of this invention (e.g., Examples 1 and 2) and the corresponding adhesive tapes made from such laminates (e.g., Examples 16–28) possess the necessary tensile strength, elongation, and porosity properties that are required for conventional medical tape applications. It is clear that a wide range of desirable physical properties can be achieved by tailoring the carded nonwoven web, the weft-inserted scrim, and the processing conditions to meet a particular end-use objective. In addition, the thermal lamination step coupled with the bonding of the scrim by thermal and chemical means, provide tapes that can be readily torn by hand in the cross direction.

What is claimed is:

1. A medical article comprising a laminate composite that is porous and finger-tearable in the machine direction and the cross direction, comprising:
    (a) a nonwoven fiber web layer;
    (b) a scrim layer adjacent to the nonwoven web layer comprising spaced-apart filaments oriented substantially in the machine direction that are substantially perpendicular to spaced-apart filaments oriented substantially in the cross direction; wherein the scrim has in the range of about 5–30 filaments/2.5-cm in the machine direction and in the range of about 5–30 filaments/2.5-cm in the cross direction; and
    (c) a binder material coated through both the nonwoven fiber web layer and the scrim layer.

2. A medical article comprising a finger-tearable laminate composite according to claim 1, wherein the nonwoven fiber web layer comprises a nonwoven carded web.

3. A medical article comprising a finger-tearable laminate composite according to claim 2, wherein the nonwoven carded web comprises polyester fibers.

4. A medical article comprising a finger-tearable laminate composite according to claim 1, wherein the scrim layer comprises polyester.

5. A medical article comprising a finger-tearable laminate composite according to claim 1, wherein the scrim layer comprises a weft-inserted scrim.

6. A medical article comprising a finger-tearable laminate composite according to claim 1, wherein the scrim layer comprises extruded plastic netting.

7. A medical article comprising a finger-tearable laminate composite according to claim 1, wherein the binder comprises a polyvinyl acrylate latex compound.

8. A medical article comprising a finger-tearable laminate composite according to claim 1, wherein the nonwoven web layer has a pattern embossed on its surface to facilitate tearing of the laminate composition.

9. A medical adhesive tape that is porous and finger-tearable in the machine direction and the cross direction, comprising:
    (a) a nonwoven fiber web layer;
    (b) a scrim layer adjacent to the nonwoven web layer comprising spaced-apart filaments oriented substantially in the machine direction that are substantially perpendicular to spaced-apart filaments oriented substantially in the cross direction; wherein the scrim has in the range of about 5–30 filaments/2.5-cm in the machine direction and in the range of about 5–30 filaments/2.5-cm in the cross direction;
    (c) a binder material coated through both the nonwoven fiber web layer and the scrim layer; and
    (d) an adhesive layer adjacent to the scrim layer.

10. A medical finger-tearable adhesive tape according to claim 9, wherein the nonwoven fiber web layer comprises a nonwoven carded web.

11. A medical finger-tearable adhesive tape according to claim 9, wherein the nonwoven carded web comprises polyester fibers.

12. A medical finger-tearable tape according to claim 9, wherein the scrim comprises polyester.

13. A medical finger-tearable tape according to claim 9, wherein the scrim comprises a weft-inserted scrim.

14. A medical finger-tearable tape according to claim 9, wherein the scrim comprises extruded plastic netting.

15. A medical finger-tearable tape according to claim 9, wherein the binder comprises a polyvinyl acrylate latex compound.

16. A medical finger-tearable tape according to claim 9, wherein the nonwoven fiber web layer has a pattern embossed on its surface to facilitate tearing of the laminate composite.

17. A medical article comprising a laminate composite that is porous and finger-tearable in the machine direction and the cross direction, comprising:
    (a) a first nonwoven fiber web layer;
    (b) a scrim layer adjacent to the first nonwoven web layer comprising spaced-apart filaments oriented substantially in the machine direction that are substantially perpendicular to spaced-apart filaments oriented substantially in the cross direction; wherein the scrim has in the range of about 5–30 filaments/2.5-cm in the machine direction and in the range of about 5–30 filaments/2.5-cm in the cross direction;
    (c) a second nonwoven web layer adjacent to the scrim layer, oriented so that the scrim layer is sandwiched between the first and second nonwoven layers; and
    (d) a binder material coated through both the nonwoven fiber layer and the scrim layer.

18. A medical article comprising the laminate composite of claim 17, and further comprising a pressure-sensitive adhesive layer on one of the first nonwoven layer or the second nonwoven layer.

19. A medical article according to claim 18, wherein the pressure-sensitive adhesive comprises a polyacrylate adhesive.

20. A medical article according to claim 17, wherein the first nonwoven web layer if comprises a carded web.

21. A medical article according to claim 17, wherein the second nonwoven web layer comprises a carded web.

22. A medical article according to claim 17, wherein both nonwoven layers comprise carded webs.

23. A medical article according to claim 20, wherein the carded web comprises polyester fibers.

24. A medical article according to claim 21, wherein the carded web comprises polyester fibers.

25. A medical article according to claim 17, wherein the scrim comprises polyester.

26. A medical article according to claim 17, wherein the scrim comprises a weft-inserted scrim.

27. A medical article according to claim 17, wherein the scrim comprises extruded plastic netting.

28. A medical article according to claim 17, wherein the binder is a polyvinyl acrylate latex compound.

29. A medical article according to claim 17, wherein at least one of the nonwoven fiber web layers has a pattern embossed on its surface to facilitate tearing of the laminate composite.

30. A method of making a medical article comprising a laminate composite that is porous and finger-tearable in both the machine direction and the cross direction, comprising the steps of:
   (a) providing a nonwoven fiber web;
   (b) providing a scrim comprising spaced-apart filaments oriented substantially in the machine direction that are substantially perpendicular to spaced-apart filaments oriented substantially in the cross direction; wherein the scrim has in the range of about 5–30 filaments/2.5-cm in the machine direction and in the range of about 5–30 filaments/2.5-cm in the cross direction;
   (c) thermally laminating the scrim to the nonwoven web to form a laminate by passing the nonwoven web and the scrim through a heated calendar apparatus comprising an upper roll and a lower roll; and
   (d) bonding the laminate with a binder solution to form a laminate composite having a binder material coated through both the nonwoven fiber web layer and the scrim layer.

31. A method of making a medical article comprising a finger-tearable laminate composite according to claim 30, wherein the nonwoven web comprises a nonwoven carded web.

32. A method of making a medical article comprising a finger-tearable laminate composite according to claim 31, wherein the carded web has a pattern embossed on its surface to facilitate tearing of the laminate composite.

33. A method of making a medical article comprising a finger-tearable laminate composition according to claim 30, wherein the scrim comprises a weft-inserted scrim.

34. A method of making a medical article comprising a finger-tearable laminate composite according to claim 30, wherein the scrim comprises extruded plastic netting.

35. A method of making a medical article comprising a laminate composition according to claim 30, wherein the binder solution comprises a solution of polyvinyl acrylate latex compound.

36. A method of making a medical article comprising a laminate composite that is porous and finger-tearable in the machine direction and the cross direction, comprising the steps of
   (a) providing a first nonwoven fiber web;
   (b) providing a scrim comprising spaced-apart filaments oriented substantially in the machine direction interwoven with spaced-apart filaments oriented substantially in the cross direction; wherein the scram has in the range of about 5–30 filaments/2.5-cm in the machine direction and in the range of about 5–30 filaments/2.5-cm in the cross direction;
   (c) providing a second nonwoven fiber web;
   (d) thermally laminating the three layers to form a laminate, such that the scrim is sandwiched between the first and second nonwoven layers, by passing them through a heated calendar apparatus comprising an upper roll and a lower roll; and
   (e) bonding the laminate with a binder solution to form a laminate composite having a binder material coated through both the nonwoven fiber web layers and the scrim layer.

37. A medical article comprising a laminate composite of claim 1 wherein the scrim layer comprises a woven or knitted scrim.

38. A medical adhesive tape of claim 9 wherein the scrim layer comprises a woven or knitted scrim.

39. A medical article comprising a laminate composite of claim 17 wherein the scrim layer comprises a woven or knitted scrim.

40. A medical article comprising a laminate composite that is porous and finger-tearable in the machine direction and the cross direction, comprising:
   (a) a nonwoven fiber web layer;
   (b) a scrim layer thermally laminated to the nonwoven web layer comprising spaced-apart filaments oriented substantially in the machine direction that are substantially perpendicular to spaced-apart filaments oriented substantially in the cross direction; wherein the scrim has in the range of about 5–30 filaments/2.5-cm in the machine direction and in the range of about 5–30 filaments/2.5-cm in the cross direction; and
   (c) a binder material coated through both the nonwoven fiber web layer and the scrim layer.

41. A medical adhesive tape that is porous and finger-tearable in the machine direction and the cross direction, comprising:
   (a) a nonwoven fiber web layer;
   (b) a scrim layer thermally laminated to the nonwoven web layer comprising spaced-apart filaments oriented substantially in the machine direction that are substantially perpendicular to spaced-apart filaments oriented substantially in the cross direction; wherein the scrim has in the range of about 5–30 filaments/2.5-cm in the machine direction and in the range of about 5–30 filaments/2.5-cm in the cross direction;
   (c) a binder material coated through both the nonwoven fiber web layer and the scrim layer; and
   (d) an adhesive layer adjacent to the scrim layer.

42. A medical article comprising a laminate composite that is porous and finger-tearable in the machine direction and the cross direction, comprising:
   (a) a first nonwoven fiber web layer;
   (b) a scrim layer thermally laminated to the first nonwoven web layer comprising spaced-apart filaments oriented substantially in the machine direction that are substantially perpendicular to spaced-apart filaments oriented substantially in the cross direction; wherein the scrim has in the range of about 5–30 filaments/2.5-cm in the machine direction and in the range of about 5–30 filaments/2.5-cm in the cross direction;
   (c) a second nonwoven web layer thermally laminated to the scram layer, oriented so that the scrim layer is sandwiched between the first and second nonwoven layers; and
   (d) a binder material coated through both the nonwoven fiber layers and the scrim layer.

* * * * *